United States Patent
Muraki et al.

(10) Patent No.: US 8,526,165 B2
(45) Date of Patent: Sep. 3, 2013

(54) DIELECTRIC CERAMIC AND LAMINATED CERAMIC CAPACITOR

(75) Inventors: Tomonori Muraki, Nagaokakyo (JP); Tomoyuki Nakamura, Nagaokakyo (JP); Makoto Matsuda, Nagaokakyo (JP); Akihiro Shiota, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 326 days.

(21) Appl. No.: 13/039,424

(22) Filed: Mar. 3, 2011

(65) Prior Publication Data
US 2011/0222205 A1 Sep. 15, 2011

(30) Foreign Application Priority Data
Mar. 11, 2010 (JP) .................. 2010-054586

(51) Int. Cl.
H01G 4/06 (2006.01)
C04B 35/00 (2006.01)

(52) U.S. Cl.
USPC ...................... 361/321.4; 501/137

(58) Field of Classification Search
USPC .... 361/321.1–321.5, 320, 311; 501/135–137
See application file for complete search history.

(56) References Cited

U.S. PATENT DOCUMENTS

| | | | |
|---|---|---|---|
| 6,656,865 B2 * | 12/2003 | Saito et al. | 501/137 |
| 7,501,371 B2 | 3/2009 | Sasabayashi et al. | |
| 7,796,373 B2 | 9/2010 | Sasabayashi et al. | |
| 2007/0135295 A1 | 6/2007 | Sasabayashi et al. | |
| 2009/0310279 A1 | 12/2009 | Sasabayashi et al. | |

FOREIGN PATENT DOCUMENTS

| | | |
|---|---|---|
| JP | 2001-015374 A | 1/2001 |
| JP | 2002080276 A | 3/2002 |
| JP | 2004055727 A | 2/2004 |
| JP | 2004189588 A | 7/2004 |
| JP | 2006-137647 A | 6/2006 |
| JP | 2006-237237 A | 9/2006 |
| JP | 2008010530 A | 1/2008 |
| JP | 2008297179 A | 12/2008 |
| WO | WO-2006117996 A1 | 11/2006 |
| WO | WO-2008105240 A1 | 9/2008 |

OTHER PUBLICATIONS

Japanese Office Action issued for corresponding JP 2010-054586, dispatch date Jun. 28, 2012 (w/English translation of Office Action).

* cited by examiner

*Primary Examiner* — Eric Thomas
(74) *Attorney, Agent, or Firm* — Dickstein Shapiro LLP (57) ABSTRACT

A dielectric ceramic (and capacitor containing it) balancing high temperature load characteristics and temperature characteristics of capacitance even when layer thickness is less than 1 μm has a mixture of different crystal grains containing a barium titanate compound as the main constituent. The first crystal grains can contain rare earth element solid solution region 1 at the surface layer section. The second crystal grains have a core-shell structure including a shell section having a rare earth element solid solution present. The first and second crystal grains are 12% to 84% f and 16% to 88%, respectively, of the total number of crystal grains.

10 Claims, 4 Drawing Sheets

DIELECTRIC CERAMIC AND LAMINATED CERAMIC CAPACITOR

BACKGROUND OF THE INVENTION

1. Field of the Invention

The present invention relates to a dielectric ceramic and a laminated ceramic capacitor, and more particularly, relates to a dielectric ceramic suitable for a laminated ceramic capacitor which has small size and high capacitance, and a laminated ceramic capacitor manufactured with the use of the dielectric ceramic.

2. Description of the Related Art

Conventionally, barium titanate based compounds with high dielectric constants have been widely used as ceramic materials for use in laminated ceramic capacitors.

With the developments in electronics technology in recent years, the reduction in size and the increase in capacitance for laminated ceramic capacitors have been progressed rapidly.

The laminated ceramic capacitor has dielectric ceramic layers and internal electrodes which are stacked alternately, and has external electrodes formed on both ends of a ceramic sintered body obtained by a firing treatment. The dielectric ceramic layers are reduced in layer thickness to stack a larger number of layers, thereby allowing for a reduction in size and an increase in capacitance for the laminated ceramic capacitors.

In addition, this type of laminated ceramic capacitor is required to have favorable high temperature load characteristics to improve the reliability, so as not to cause defects even when the laminated ceramic capacitor is exposed to high temperature atmosphere for a long period of time. For this reason, the improvement in reliability has been conventionally made by adding a rare earth element to a dielectric ceramic to provide a solid solution of the rare earth element in the main phase grains.

However, when the solid solubility of the rare earth element in the main phase grains is too much, new problems are caused, such as significantly degraded temperature characteristics of capacitance. Thus, the rare earth element is desirably present as a solid solution partly in the main phase grains.

Dielectric ceramics have been developed which have a core-shell structure in which a rare earth element is present as a solid solution only near the surfaces of main phase grains, or have a mixed crystal structure including a mixture of crystal grains of main phase grains with no rare earth element present therein as a solid solution and crystal grains of main phase grains with a rare earth element present therein as a solid solution.

For example, Japanese Patent Application Laid-Open No. 2002-80276 (claim 1, section [0013]) proposes a dielectric porcelain composition including ceramic grains of core-shell structure, in which the core section is composed of domains of almost pure barium titanate, and the shell section is composed of a solid solution containing barium titanate as a main constituent, and the ratio of the number of grains of the entire ceramic forming the sintered body is controlled to 15% or more in a cross section of the sintered body. The control of the ratio of the number of ceramic grains to the total number of ceramic grains to 15% or more allows a laminated ceramic capacitor with a thickness of about 5 μm before firing and with 10 layers stacked to ensure the reliability with favorable lifetime characteristics and provide favorable temperature characteristics of capacitance.

SUMMARY OF THE INVENTION

In recent years, further reduction in size has been required for the laminated ceramic capacitors, and a reduction in layer thickness to less than 1 μm has been also required for the thickness of the dielectric ceramic layer.

Although Japanese Patent Application Laid-Open No. 2002-80276 allows a laminated ceramic capacitor with a thickness on the order of 5 μm before firing to achieve a balance between high temperature load characteristics and temperature characteristics of capacitance, the laminated ceramic capacitor has the problem of difficulty in achieving the balance between high temperature load characteristics and temperature characteristics of capacitance when the dielectric ceramic layers are reduced in layer thickness to less than 1 μm. Moreover, it is difficult to control the solid solubility with a high degree of accuracy even when a rare earth element is present as a solid solution in main phase grains.

The present invention has been achieved in view of these circumstances, and an object of the present invention is to provide a dielectric ceramic which is capable of achieving a balance between high temperature load characteristics and temperature characteristics of capacitance, even in the case of reduction in layer thickness to less than 1 μm, and a laminated ceramic capacitor manufactured with the use of the dielectric ceramic.

The present inventors have conducted earnest studies on the addition of a rare earth element to a barium titanate based compound and found that the crystal structure of a dielectric ceramic is made a mixed crystal structure including crystal grains containing only a minute amount of a rare earth element therein as a solid solution and including crystal grains of core-shell structure, in such a way that the respective ratios of the numbers of the both types of crystal grains fall within predetermined ranges, allows the achievement of a balance between high temperature load characteristics and temperature characteristics of capacitance even when the dielectric ceramic is reduced in layer thickness to less than 1 μm.

The present invention has been made based on such findings, and provides a dielectric ceramic wherein main phase grains contains a barium titanate based compound as their main constituent, and contains at least one rare earth element R selected from La, Ce, Pr, Nd, Gd, Tb, Dy, Ho, Er, Tm, Tb, Lu, and Y, the dielectric ceramic has a mixed crystal structure including a mixture of first crystal grains and second crystal grains, the first crystal grains including the main phase grains by themselves or including the main phase grains having therein the rare earth element R in a minute amount present as a solid solution, and the second crystal grains including a core section including the main phase grains and a shell section including the main phase grains having therein the rare earth element R present as a solid solution, the shell section formed around the core section, and the respective ratios of the numbers of the first and second crystal grains to the total number of crystal grains are 12% to 84% for the first crystal grains and 16% to 88% for the second crystal grains.

The present invention also provides the dielectric ceramic wherein the first crystal grains have the rare earth element R with its solid solubility distance of 5 nm or less (including 0) in the main phase grain from the surface of the main phase grain toward the inside thereof.

The present invention further provides the dielectric ceramic wherein the shell section has a thickness of ⅛ or more and ⅜ or less the diameter of the main phase grain.

In addition, the present invention provides the dielectric ceramic wherein the composition formula is represented by a general formula $\{100(Ba_{1-x}Ca_x)mTiO_3+aRO_{3/2}+bMgO+cMO_y+dSiO_2+eLiO_{1/2}\}$. In the formula, M represents at least one of Mn and V, and y represents a positive number determined unambiguously by the valence of M, and the m, x, a, b, c, d, and e respectively satisfy the following formulas:

$0.960 \leqq m \leqq 1.030$; $0 \leqq x \leqq 0.20$; $0.2 \leqq a \leqq 5.0$; $0 \leqq b \leqq 2.0$; $0.2 \leqq c \leqq 1.0$; $0.5 \leqq d \leqq 4.0$; and $0.5 \leqq e \leqq 6.0$.

Further, the present invention provides a laminated ceramic capacitor including: a ceramic sintered body obtained by alternately stacking and firing dielectric ceramic layers and internal electrodes; and external electrodes formed on both ends of the ceramic sintered body, wherein the dielectric ceramic layers are formed from the above-mentioned dielectric ceramic.

The dielectric ceramic includes main phase grains containing a barium titanate based compound as their main constituent, and containing a specific rare earth element R such as La or Ce, has a mixed crystal structure including a mixture of first crystal grains including the main phase grains by themselves or including the main phase grains having therein the rare earth element R in a minute amount present as a solid solution and second crystal grains of core-shell structure, and in the dielectric ceramic, the respective ratios of the numbers of the first and second crystal grains to the total number of crystal grains are 12% to 84% for the first crystal grains and 16% to 88% for the second crystal grains. Thus, dielectric ceramics can be obtained which have favorable high temperature load characteristics and favorable temperature characteristics of capacitance even in the case of the reduction in layer thickness to less than 1 μm.

Specifically, even in the case of the reduction in layer thickness to less than 1 μm, dielectric ceramics can be obtained which have a long lifetime of 150 hours or more against the application of a direct-current voltage of 12.5 V at a high temperature of 150° C., and allow the achievement of a balance between high temperature load characteristics which satisfy the X5R characteristics of the EIA standards and temperature characteristics of capacitance.

The first crystal grains have the rare earth element R with its solid solubility distance of 5 nm or less (including 0) in the main phase grain from the surface of the main phase grain toward the inside thereof, and furthermore, the shell section has a thickness of ⅛ or more and ⅜ or less the diameter of the main phase grain. Thus, the advantageous effect mentioned above can be produced easily.

In addition, the composition formula is represented by a general formula $\{100(Ba_{1-x}Ca_x)_mTiO_3 + aRO_{3/2} + bMgO + cMO_y + dSiO_2 + eLiO_{1/2}\}$. In the formula, M represents at least one of Mn and V, and y represents a positive number determined unambiguously by the valence of M, and the m, x, a, b, c, d, and e respectively satisfy the following formulas: $0.960 \leqq m \leqq 1.030$; $0 \leqq x \leqq 0.20$; $0.2 \leqq a \leqq 5.0$; $0 \leqq b \leqq 2.0$; $0.2 \leqq c \leqq 1.0$; $0.5 \leqq d \leqq 4.0$; and $0.5 \leqq e \leqq 6.0$. Thus, even in the case of containing additives such as MgO, MnO, $V_2O_5$, $SiO_2$, and $Li_2O$ in addition to the barium titanate based compound and the rare earth element R, desired dielectric ceramics can be obtained which have no influence on the high temperature load characteristics or the temperature characteristics of capacitance.

In the laminated ceramic capacitor according to the present invention, which includes a sintered laminated body obtained by alternately stacking and firing dielectric ceramic layers and internal electrodes and has external electrodes formed on both ends of the ceramic sintered body, the dielectric ceramic layers are formed from the dielectric ceramic described above. Thus, a laminated ceramic capacitor can be obtained which has high reliability and favorable temperature characteristics of capacitance.

DETAILED DESCRIPTION OF THE INVENTION

Next, an embodiment of the present invention will be described in detail.

Figure 1:
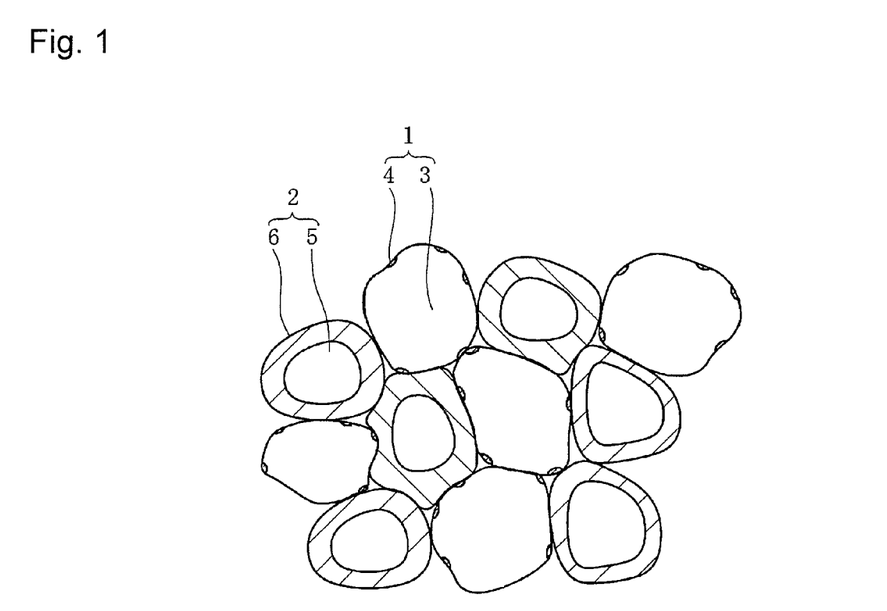
FIG. 1 is a cross-sectional view schematically illustrating an embodiment of a dielectric ceramic according to the present invention.

FIG. 1 is a cross-sectional view schematically illustrating an embodiment of a dielectric ceramic according to the present invention.

This dielectric ceramic has a mixed crystal structure including a mixture of first crystal grains 1 and second crystal grains 2 which differ in grain structure from each other. In addition, the first crystal grains 1 and the second crystal grains 2 both contain main phase grains at their main constituent.

Figure 2:
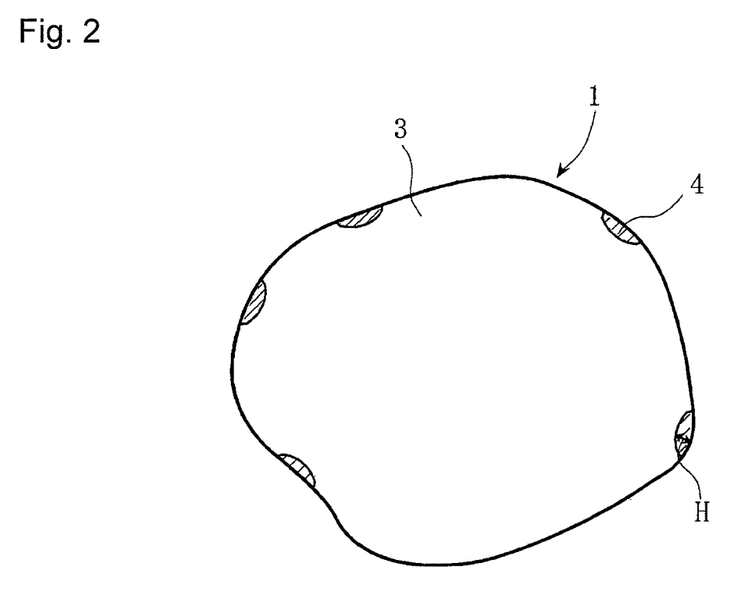
FIG. 2 is an enlarged cross-sectional view of a first crystal grain.

FIG. 2 is an enlarged cross-sectional view of a first crystal grain 1.

The first crystal grain 1 has a rare earth element solid solution region 4 in which a rare earth element R is present as a solid solution, which is formed at the surface layer section of a main phase grain 3. More specifically, a minute amount of rare earth element R is present as a solid solution in the surface layer section of the main phase grain 3, as indicated by the solubility distance H of R being no more than 5 nm inward from the surface of the grain, thereby forming the rare earth element solid solution region 4 partly at the surface layer section of the main phase grain 3. In the present embodiment, the solid solubility distance H of the rare earth element R in the main phase grain 3 is controlled to a small distance of 5 nm or less from the surface of the main phase grain 3 toward the inside thereof in the case of the rare earth element solid solution region 4.

Figure 3:
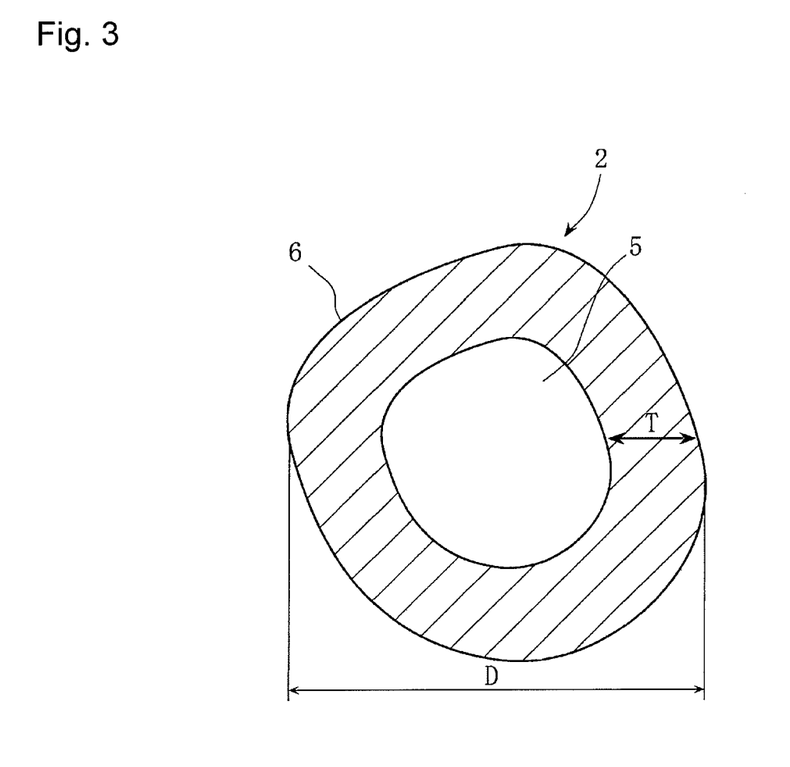
FIG. 3 is an enlarged cross-sectional view of a second crystal grain.

FIG. 3 is an enlarged cross-sectional view of a second crystal grain 2.

The second crystal grain 2 has a core-shell structure including a core section 5 compose of a main phase grain and a shell section 6 which has a rare earth element R present as a solid solution in the crystal grain and is formed around the core section 5. In addition, in the present embodiment, the thickness T of the shell section 6 is ⅛ or more and ⅜ or less of the diameter D of the main phase grain.

The main phase grains contain a barium titanate based compound as its main constituent. The barium titanate compound has a perovskite type structure represented by the general formula $ABO_3$, and in the present embodiment, $BaTiO_3$ with Ba formed at the A site and Ti formed at the B site, and $(Ba, Ca)TiO_3$ with some of Ba substituted by Ca can also be used. While the molar ratio A/B of the combination of the A site with the B site is 1.000 stoichiometrically, the A site and the B site are combined so as to have an excess amount of A site or B site, if necessary, to such an extent that the various characteristics, the sinterability, etc. are not affected.

In addition, at least one selected from La, Ce, Pr, Nd, Gd, Tb, Dy, Ho, Er, Tm, Tb, Lu, and Y can be used as the specific rare earth element R.

In the present embodiment, the respective ratios of the numbers of the first and second crystal grains 1 and 2 to the total number of crystal grains are 12% to 84% for the first crystal grains 1 and 16% to 88% for the second crystal grains 2.

The reasons therefor will be given below.

(1) The Ratio of The Number of First Crystal Grains 1

The dielectric ceramic which has a mixed crystal structure composed of the first crystal grains 1 and the second crystal grains 2 allows the achievement of a balance between high temperature load characteristics and temperature characteristics of capacitance, even in the case of the reduction in layer thickness to less than 1 μm.

When the ratio of the number of the first crystal grins 1 to the total number of crystal grains is greater than 84%, there is a possibility that the lifetime in the case of a high temperature load may be lowered to degrade the high temperature load characteristics, and thus lead to decreased reliability. On the other hand, when the ratio of the number of the first crystal grins 1 to the total number of crystal grains is less than 12%, there is a possibility that the rate of capacitance change to temperature may be increased to lead to degradation of temperature characteristics.

Accordingly, the ratio of the number of the first crystal grains 1 to the total number of crystal grains is controlled to 12% to 84% to achieve a balance between the high temperature load characteristics and temperature characteristics of capacitance.

(2) The Ratio of The Number of Second Crystal Grains 2

The dielectric ceramic which has a mixed crystal structure composed of the first crystal grains 1 and the second crystal grains 2 allows the achievement of a balance between high temperature load characteristics and temperature characteristics of capacitance, even in the case of the reduction in layer thickness to less than 1 μm as described above.

When the ratio of the number of the second crystal grins 2 to the total number of crystal grains is greater than 88%, there is a possibility that the rate of capacitance change to temperature may be increased to lead to degradation of temperature characteristics. On the other hand, when the ratio of the number of the second crystal grins 2 to the total number of crystal grains is less than 16%, there is a possibility that the lifetime in the case of high temperature load may be lowered to degrade the high temperature load characteristics, and thus lead to decreased reliability.

Accordingly, the ratio of the number of the second crystal grains 2 to the total number of crystal grains is controlled to 16% to 88% to achieve a balance between the high temperature load characteristics and temperature characteristics of capacitance.

In the present invention, the mixed crystal based structure including both the first crystal grains 1 and the second crystal grains 2 in the ranges mentioned above achieves a balance between the high temperature load characteristics and temperature characteristics of capacitance.

It is to be noted that the respective ratios of the numbers of the first crystal grains 1 and second crystal grains 2 can be controlled by adjusting the crystallinity of the main constituent powder and the firing temperature as will be described later.

What is required for the dielectric ceramic described above is that at least the first crystal grains 1 and the second crystal grains 2 are mixed in the dielectric ceramic at the mentioned ratios of the numbers to the total number of crystal grains, and it is not necessary to form the dielectric ceramic of only the first crystal grains 1 and the second crystal grains 2. More specifically, as long as the first crystal grains 1 and the second crystal grains 2 are mixed in the dielectric ceramic at the mentioned ratios of the numbers to the total number of crystal grains, third crystal grains which have a different crystal structure from the first crystal grains 1 and the second crystal grains 2 may be present in the dielectric ceramic.

While the first crystal grains 1 contain the rare earth element R in minute amounts as a solid solution in the main phase grains in the present embodiment, the main phase grains may be present by themselves, and in this case, the solid solubility distance H in FIG. 2 will be 0.

What is required for the dielectric ceramic according to the present invention is to include at least the main phase grains containing a barium titanate based compound as their main constituent and the rare earth element R, and it is also preferable to add a Mg oxide, a Mn oxide, a V oxide, a Si oxide such as a sintering aid, or a Li oxide to the dielectric ceramic, if necessary.

In this case, the composition formula of the dielectric ceramic can be represented by the following general formula (A).

$$100(Ba_{1-x}Ca_x)_mTiO_3 + aRO_{3/2} + bMgO + cMO_y + dSiO_2 + eLiO_{1/2} \quad (A)$$

In the formula, M represents at least one of Mn and V, and y represents a positive number determined unambiguously by the valence of M.

In addition, m is the combination molar ratio between the A site and the B site, x is the substitution molar ratio of Ca to Ba, and a, b, c, d, and e respectively represent the parts by mol for $RO_{3/2}$, $MgO$, $MO_y$, $SiO_2$, and $LiO_{1/2}$ with respect to 100 parts by mol of $(Ba_{1-x}Ca_x)_mTiO_3$ as a main constituent. Furthermore, these m, x, a, b, c, d, and e preferably fall within the ranges of the following mathematical formulas (1) to (7), respectively.

$$0.960 \leq m \leq 1.030 \quad (1)$$

$$0 \leq x \leq 0.20 \quad (2)$$

$$0.2 \leq a \leq 5.0 \quad (3)$$

$$0 \leq b \leq 2.0 \quad (4)$$

$$0.2 \leq c \leq 1.0 \quad (5)$$

$$0.5 \leq d \leq 4.0 \quad (6)$$

$$0.5 \leq e \leq 6.0 \quad (7)$$

More specifically, the general formula (A) satisfying the mathematical formulas (1) to (7) allows a dielectric ceramic with reliability and a balance between high temperature load characteristics and temperature characteristics of capacitance to be obtained even when the layer thickness is reduced to less than 1 μm.

It is to be noted that additives other than the rare earth element oxide $RO_{3/2}$ in the general formula (A), that is, MgO, $MO_y$, $SiO_2$, and $LiO_{1/2}$ are not to be considered particularly limited in terms of existence form, and may be present as a solid solution in the main constituent or may be present at crystal grain boundaries or the triple points of the crystals.

Next, a laminated ceramic capacitor manufactured with the use of the dielectric ceramic will be described in detail.

Figure 4:
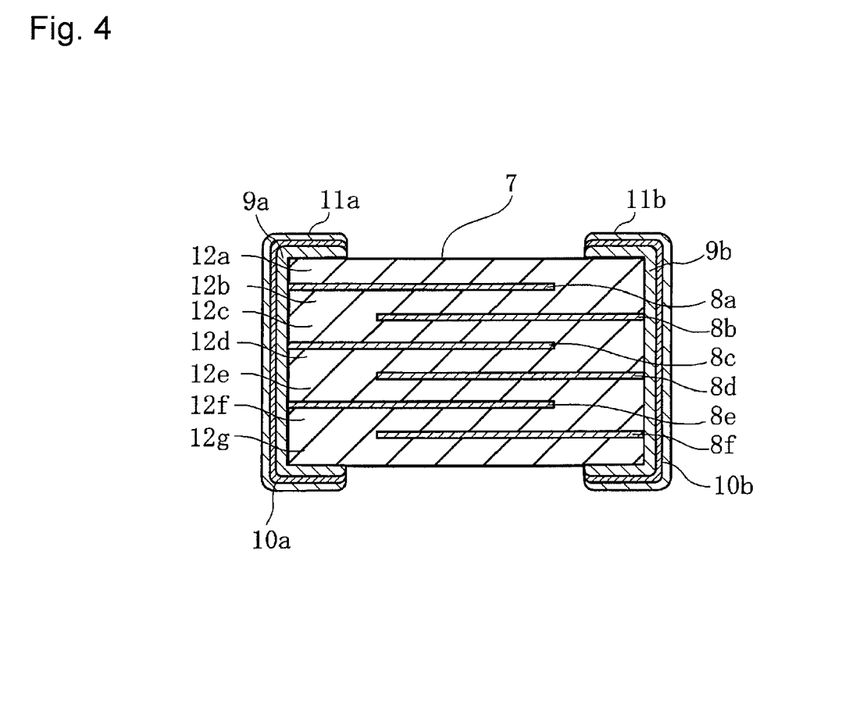
FIG. 4 is a cross-sectional view illustrating an embodiment of a laminated ceramic capacitor manufactured with the use of the dielectric ceramic.

FIG. 4 is a cross-sectional view schematically illustrating an embodiment of the laminated ceramic capacitor.

The laminated ceramic capacitor has internal electrodes 8a to 8f buried in a ceramic sintered body 7, external electrodes 9a and 9b formed at the both ends of the ceramic sintered body 7, and further first plating films 10a and 10b and second plating films 11a and 11b formed on the surfaces of the external electrodes 9a and 9b.

More specifically, the ceramic sintered body 7 is composed of dielectric ceramic layers 12a to 12g and internal electrode layers 8a to 8f which are stacked alternately and fired, and the internal electrode layers 8a, 8c, and 8e are electrically connected to the external electrode 9a, whereas the internal electrode layers 8b, 8d, and 8f are electrically connected to the external electrode 9b. Capacitance is formed between the opposed surfaces of the internal electrode layers 8a, 8c, and 8e and internal electrode layers 8b, 8d, and 8f.

Next, a method for manufacturing the laminated ceramic capacitor will be described in detail.

First, a Ba compound and a Ti compound are prepared as ceramic raw materials, and if necessary, a Ca compound is prepared. Then, these ceramic raw materials are weighed in predetermined amounts, and the weighed materials are charged into a ball mill along with a grinding medium such as PSZ (Partly Stabilized Zirconia) balls and pure water for wet mixing and grinding the materials, and after drying, subjected to calcination at a temperature of 950° C. to 1150° C. for a predetermined period of time, thereby producing a main constituent powder composed of a barium titanate based compound.

Next, the crystallinity of the main constituent powder is analyzed to sort the main constituent powder into a high-crystallinity main constituent powder and a low-crystallinity main constituent powder, and the both powders are then mixed and weighed in a predetermined amount.

An R compound, and if necessary, a Mg compound, a Mn compound, a V compound, a Li compound, a Si compound, etc, are prepared, and weighed in predetermined amounts. These weighed compounds are charged into a ball mill along with PSZ balls and pure water for wet mixing and grinding the compounds, and dried to produce a ceramic raw material powder.

Then, the ceramic raw material powder is charged into a ball mill along with an organic binder, an organic solvent, and a grinding medium for carrying out wet mixing to produce a ceramic slurry, and the ceramic slurry is subjected to a shape forming process in accordance with a RIP method or the like to produce such ceramic green sheets that each provide a thickness of less than 1 μm after firing.

A conductive paste for internal electrodes is used to apply screen printing onto the ceramic green sheets, thereby forming a conductive film in a predetermined pattern on the surfaces of the ceramic green sheets.

It is to be noted that while the conductive material contained in the conductive paste for internal electrodes is not to be considered particularly limited, the use of a base metal material containing Ni, Cu, or an alloy thereof as its main constituent is preferable in terms of reduction in cost.

Then, the multiple ceramic green sheets with the conductive films formed are stacked in a predetermined direction, sandwiched by ceramic green sheets with no conductive film formed, subjected to pressure bonding, and cut into a predetermined size to produce a ceramic laminate. Then, the ceramic laminate is subjected to a heat treatment for removing the binder at a temperature of 300° C. to 500° C., and further subjected to a firing treatment at a predetermined temperature for about 2 hours under a reducing atmosphere composed of a $H_2$—$N_2$—$H_2O$ gas with its oxygen partial pressure controlled to $10^{-9}$ MPa to $10^{-12}$ MPa. This firing treatment sinters both the conductive films and the ceramic green sheets to provide a ceramic sintered body 7 in which the internal electrodes 8a to 8f are buried.

It is to be noted that, for example, this firing treatment brings the high-crystallinity main constituent powder of the main constituent powder into first crystal grains 1 because the high-crystallinity main constituent powder is less likely to have therein additive constituents, such as a rare earth element R, present as a solid solution. In addition, the low-crystallinity main constituent powder is more likely to have therein the additive constituents such as a rare earth element R present as a solid solution, and thus brought into second crystal grains 2 of core-shell structure.

The respective ratios of the numbers of the first crystal grains 1 and second crystal grains 2 to the total number of crystal grains can be controlled by adjusting the firing temperature, and for example, the ratios of the numbers can be controlled to fall within the ranges according to the present invention as described above, by firing at a maximum temperature in the range of 990° C. to 1025° C.

Thus, the dielectric ceramic layers 12a to 12g form a mixed crystal structure composed of the first crystal grains 1 and second crystal grains 2 which differ in grain structure from each other.

Next, a conductive paste for external electrodes is applied to both end surfaces of the ceramic sintered body 7, and subjected to a firing treatment at a temperature of 600° C. to 800° C. to form external electrodes 9a and 9b.

It is to be noted that while the conductive material contained in the conductive paste for external electrodes is also not to be considered particularly limited, the use of Ag or Cu, or a material containing an alloy thereof as its main constituent is preferable in terms of reduction in cost.

As the method for forming the external electrodes 9a and 9b, the conductive paste for external electrodes may be applied onto the both end surfaces of the ceramic laminate, and then subjected to a firing treatment at the same time as the ceramic laminate.

Then, finally, electrolytic plating is applied to form first plating films 10a and 10b composed of Ni, Cu, an Ni—Cu alloy, or the like on the surfaces of the external electrodes 9a and 9b, and second plating films 11a and 11b composed of solder, tin, or the like are further formed on the first plating films 10a and 10b, thereby producing a laminated ceramic capacitor.

It is to be noted that the present invention is not to be considered limited to the embodiment described above. For example, while additive constituents other than the rare earth element R, Mg, Mn, V, Si, and Li have not been mentioned in the embodiment, $Al_2O_3$, CuO, etc. are preferably contained as additives, if necessary, in terms of improvements in various characteristics such as electrical characteristics and in reliability.

In addition, the ceramic raw materials such as the barium compound and the titanium compound can be also selected appropriately depending on the mode of the synthesis reaction, such as carbonates, oxides, nitrates, hydroxides, organic acid salts, alkoxides, and chelate compounds.

Although there is a possibility that impurities such as Al, Fe, and Co will be mixed into the crystal grains and at crystal grain boundaries in the process of producing the laminated ceramic capacitor, the impurities will not affect the electrical characteristics of the capacitor.

Furthermore, although there is a possibility that the internal electrode constituents will diffuse into the crystal grains and crystal grain boundaries in the firing treatment for the laminated ceramic capacitor, the diffusion will also not affect the electrical characteristics of the capacitor in this case.

Next, examples of the present invention will be specifically described.

EXAMPLE 1

Production of Samples

BaCO$_3$ and TiO$_2$ were weighed in predetermined amounts as ceramic raw materials, and these weighed materials were charged into a ball mill along with PSZ balls and pure water for wet mixing and grinding the materials, and after drying, subjected to calcination at a temperature of 1050° C. for about two hours, thereby producing a main constituent powder composed of Ba$_{1.007}$TiO$_3$.

Next, the crystallinity of the main constituent powder was analyzed by an X-ray diffractometer (XRD). Then, the main constituent powder was sorted into a high-crystallinity main constituent powder and a low-crystallinity main constituent powder, and the both powders were mixed and weighed in a predetermined amount.

DyO$_{3/2}$ was prepared as the specific rare earth element R, and MgO, MnO, V$_2$O$_5$, and SiO$_2$ were prepared as other additive constituents. The additive powders were each weighed so as to provide DyO$_{3/2}$: 1 part by mol, MgO: 0.7 parts by mol, MnO: 0.3 parts by mol, VO$_{5/2}$: 2 parts by mol, and SiO$_2$: 1.5 parts by mol. The weighed additive powders were charged into a ball mill along with PSZ balls and pure water for wet mixing and grinding the materials, and dried to provide a ceramic raw material powder.

The ceramic raw material powder was charged into a ball mill along with ethanol, a polyvinyl butyral based binder, and PSZ balls for carrying out wet mixing, thereby producing a ceramic slurry. Then, the ceramic slurry was subjected to filtering to remove extremely fine grains and coarse grains, and then to shape forming in accordance with a RIP method to produce ceramic green sheets such that the dielectric ceramic layer had a thickness of 0.9 μm after firing.

A conductive paste which contained a Ni powder for internal electrodes was prepared. Then, this conductive paste for internal electrodes was used to apply screen printing onto the ceramic green sheets, thereby forming a conductive film in a predetermined pattern on the surfaces of the ceramic green sheets.

The ceramic green sheets with the conductive films formed were stacked as a predetermined number of sheets, sandwiched by ceramic green sheets with no conductive film formed, subjected to pressure bonding, and cut into a predetermined size to produce a ceramic laminate. Then, the ceramic laminate was subjected to a heat treatment for removing the binder at a temperature of 300° C. under a nitrogen atmosphere, and further subjected to a firing treatment at a maximum temperature of 980° C. to 1040° C. for about 2 hours under a reducing atmosphere composed of a H$_2$—N$_2$—H$_2$O gas with its oxygen partial pressure controlled to 10$^{-10}$ MPa. This firing treatment sintered both the conductive films and the ceramic green sheets to provide a ceramic sintered body with internal electrodes buried therein. It is to be noted that this firing treatment brings the high-crystallinity main constituent powder of the main constituent powder into first crystal grains and low-crystallinity main constituent powder into second crystal grains.

Next, a conductive paste for external electrodes which had a Cu powder with B$_2$O$_3$—Li$_2$O—SiO$_2$—BaO based glass frit added thereto was prepared. Then, the conductive paste for external electrodes was applied onto both end surfaces of the ceramic sintered body, and subjected to a firing treatment at a temperature of 800° C. under a nitrogen atmosphere to form external electrodes, thereby producing samples of sample numbers 1 to 6.

The obtained samples had external dimensions of 2.0 mm in length, 1.2 mm in width, and 1.0 mm in thickness, and had the dielectric ceramic layers with a thickness of 0.9 μm. In addition, the effective number of dielectric ceramic layers was 100, and the area of the electrode opposed per layer was 1.4 mm$^2$.

Evaluation of Samples

The respective ratios of the numbers of first crystal grains and second crystal grains to the total number of crystal grains were obtained for each of the samples of sample numbers 1 to 6.

More specifically, the number of crystal grains to be analyzed was set to 100, and a probe of 2 nm was used to carry out a composition analysis by TEM-EDX (energy dispersive X-ray spectrometry). For each crystal grain, 5 points were analyzed at an interval of 2 nm from a crystal grain boundary, and 5 points were further analyzed at an interval of 15 nm from the analyzed points. It was checked at each analyzed point whether or not D$_y$O$_{3/2}$ was detected, and furthermore, the presence or absence of any first crystal grain and second crystal grain was determined for each crystal grain.

In this case, the crystal grain was determined as a first crystal grain if the crystal grain had the D$_y$O$_{3/2}$ with its solid solubility distance of 5 nm or less in the main phase grain form the surface of the main phase grain toward the inside thereof, whereas the crystal grain is determined as a second crystal grain if the crystal grain has a grain structure of core-shell structure in which the shell section has a thickness T of ⅛ or more and ⅜ or less the diameter D of the main phase grain.

The relative dielectric constant, the rate of capacitance change to temperature, and the average life were measured for each of the samples of sample numbers 1 to 6.

The relative dielectric constant was obtained from the capacitance measured with the use of an automatic bridge measurement instrument under the conditions of a temperature of 25° C., a frequency of 1 kHz, and an effective voltage of 0.5 Vrms, and, from the sample dimensions.

The rate of capacitance change to temperature was measured at −55° C. to +85° C. with a capacitance at 25° C. as a reference. Then, the temperature characteristics of capacitance were evaluated from the maximum value of the rate of capacitance change to temperature. It is to be noted that if the rate of capacitance change falls within ±15% in the range of −55° C. to +85° C. with a capacitance at 25° C. as a reference, the X5R characteristics of the EIA standards will be satisfied.

In addition, the respective samples of sample numbers 1 to 6 were subjected to an accelerated reliability experiment to evaluate high temperature load characteristics. More specifically, a direct-current voltage of 12.5 V was applied at a high temperature of 150° C. to measure the change in insulation resistance with time, the sample was determined as a defective when the insulation resistance of the samples was decreased to 10$^5$Ω or less, and the average life was calculated to evaluate the high temperature load characteristics.

Table 1 shows the firing temperature, as well as the measurement result of the respective ratios of the numbers of first crystal grains and second crystal grains to the total number of crystal grains, the relative dielectric constant, the rate of capacitance change to temperature, and the average life for sample numbers 1 to 6.

TABLE 1

| Sample No. | Firing Temperature (°C.) | Ratio of Number (%) | | Relative Dielectric Constant | Rate of Capacitance Change to Temperature (%) | Average Life (hr) |
|---|---|---|---|---|---|---|
| | | First Crystal Grains/All Crystal Grains | Second Crystal Grains/All Crystal Grains | | | |
| 1 | 1025 | 12 | 88 | 2100 | −10 | 160 |
| 2 | 1015 | 40 | 48 | 1800 | −14 | 220 |
| 3 | 1010 | 52 | 24 | 1700 | −12 | 180 |
| 4 | 990 | 84 | 16 | 1600 | −13 | 150 |
| *5 | 1040 | 0 | 92 | 2000 | −17 | 180 |
| *6 | 980 | 88 | 12 | 1400 | −14 | 120 |

*outside the scope of the present invention

As is clear from sample numbers 1 to 6, it is determined that the firing temperature can control the respective ratios of the numbers of first crystal grains and second crystal grains to the total number of crystal grains.

More specifically, in the case of sample number 5, the high firing temperature of 1040° C. promoted the solid solubility of $DyO_{3/2}$ in the main phase grains excessively, thereby resulting in an absence of first crystal grains, and providing a high ratio of 92% for the ratio of the number of second crystal grains to the total number of crystal grains. As a result, it has been determined that the rate of capacitance change to temperature is −17% in the case of this sample number 5, which fails to fall within the range of ±15%, and the sample number 5 thus fails to satisfy the X5R characteristics of the EIA standards.

In the case of sample number 6, the low firing temperature of 980° C. was less likely to promote the solid solubility of $DyO_{3/2}$ in the main phase grains, thereby providing a high ratio of 88% for the ratio of the number of first crystal grains to the total number of crystal grains and a low ratio of 12% for the ratio of the number of second crystal grains to the total number of crystal grains. As a result, this sample number 6 provided a short average life of 120 hours, and it has been determined that the sample number 6 is inferior in high temperature load characteristics, and thus fails to ensure sufficient reliability.

In contrast, the firing in the case of sample numbers 1 to 4 carried out at the moderate temperatures of 990° C. to 1025° C. results in ratios of 12% to 84% for the ratio of the number of first crystal grains to the total number of crystal grains and 16% to 88% for the ratio of the number of second crystal grains to the total number of crystal grains, which all fall within the ranges according to the present invention. As a result, it has been determined that the rate of capacitance change to temperature is −10% to −14% in the case of sample numbers 1 to 4, which fall within the range of ±15%, and the sample numbers 1 to 4 thus satisfy the X5R characteristics of the EIA standards. In addition, the sample numbers 1 to 4 provided a long lifetime of 150 to 220 hours for the average life, and it has been thus determined that sample numbers 1 to 4 have favorable high temperature load characteristics, thereby allowing for high reliability.

EXAMPLE 2

$BaCO_3$, $TiO_2$, and $CaCO_3$ were prepared as ceramic raw materials to produce a main constituent powder composed of $(Ba_{1-x}Ca_x)_m TiO_2$ (m is 0.960 to 1.030, and x is 0 to 0.20) in accordance with the same method and procedure as in Example 1.

Next, a rare earth element oxide $RO_{3/2}$ (R is La, Ce, Pr, Nd, Sm, Eu, Gd, Tb, Dy, Ho, Er, Tm, Yb, Lu, or Y), as well as MgO, MnO, $VO_{5/2}$, $SiO_2$, and $LiO_{1/2}$ were prepared as additive constituents.

Then, the main constituent powder and the additive constituents were weighed so as to provide molar ratios as shown in Table 2, and the weighed main constituent powders and additive constituents were used to provide ceramic raw material powders in accordance with the same method as in Example 1.

These ceramic raw material powders were used to produce ceramic green sheets such that dielectric ceramic layers had a thickness of 0.8 μm after firing, in accordance with the same method and procedure as in Example 1, and a firing treatment was further carried out at a firing temperature of 1025° C. to produce samples of sample numbers 11 to 27.

Next, the respective ratios of the numbers of first crystal grains and second crystal grains to the total number of crystal grains were obtained for the respective samples of sample numbers 11 to 27 in accordance with the same method and procedure as in Example 1, to confirm that the ratios fall within the ranges according to the present invention.

The relative dielectric constant, the rate of capacitance change to temperature, and the average life were measured for each of the samples of sample numbers 11 to 27, in accordance with the same method and procedure as in Example 1.

Table 2 shows the composition and measurement results for each of the samples of sample numbers 11 to 27.

TABLE 2

| Sample No. | $100(Ba_{1-x}Ca_x)_m TiO_3 + aRO_{3/2} + bMgO + cMO_v + dSiO_2 + eLiO_{1/2}$ | | | | | | | | | Relative Dielectric Constant | Rate of Capacitance Change to Temperature (%) | Average Life (hr) |
|---|---|---|---|---|---|---|---|---|---|---|---|---|
| | m | x | R | a | b | M | c | d | e | | | |
| 11 | 0.960 | 0.00 | La | 0.8 | 0.7 | Mn/V(0.1/0.2) | 0.3 | 1.4 | 3.2 | 2100 | −11 | 170 |
| 12 | 1.030 | 0.00 | Ce | 0.8 | 0.7 | Mn/V(0.1/0.2) | 0.3 | 1.4 | 3.2 | 1600 | −13 | 200 |
| 13 | 1.007 | 0.00 | Pr | 0.8 | 0.7 | Mn/V(0.1/0.2) | 0.3 | 1.4 | 3.2 | 2000 | −13 | 170 |
| 14 | 1.007 | 0.20 | Nd | 0.8 | 0.7 | Mn/V(0.1/0.2) | 0.3 | 1.4 | 3.2 | 1900 | −12 | 180 |
| 15 | 1.007 | 0.10 | Sm | 0.2 | 0.7 | Mn/V(0.1/0.2) | 0.3 | 1.4 | 3.2 | 1800 | −11 | 190 |
| 16 | 1.007 | 0.00 | Eu | 5.0 | 0.7 | Mn/V(0.1/0.2) | 0.3 | 1.4 | 3.2 | 1800 | −13 | 170 |
| 17 | 1.007 | 0.00 | Gd | 1.0 | 0.0 | Mn/V(0.1/0.2) | 0.3 | 1.4 | 3.2 | 1900 | −12 | 170 |
| 18 | 1.007 | 0.00 | Tb | 0.8 | 2.0 | Mn/V(0.1/0.2) | 0.3 | 1.4 | 3.2 | 1700 | −12 | 190 |
| 19 | 1.007 | 0.00 | Dy | 0.8 | 0.7 | Mn/V(0.1/0.1) | 0.2 | 1.4 | 3.2 | 1900 | −13 | 170 |
| 20 | 1.007 | 0.00 | Ho | 0.8 | 0.7 | Mn/V(0.5/0.5) | 1.0 | 1.4 | 3.2 | 1800 | −13 | 190 |
| 21 | 1.007 | 0.00 | Er | 0.8 | 0.7 | Mn | 0.4 | 1.4 | 3.2 | 2000 | −12 | 180 |
| 22 | 1.007 | 0.00 | Tm | 0.8 | 0.7 | V | 0.4 | 1.4 | 3.2 | 2000 | −11 | 170 |
| 23 | 1.007 | 0.00 | Yb | 1.5 | 0.7 | Mn/V(0.1/0.2) | 0.3 | 0.5 | 3.2 | 1900 | −12 | 160 |

TABLE 2-continued

| Sample No. | 100(Ba$_{1-x}$Ca$_x$)$_m$TiO$_3$ + aRO$_{3/2}$ + bMgO + cMO$_y$ + dSiO$_2$ + eLiO$_{1/2}$ | | | | | | | | Relative Dielectric Constant | Rate of Capacitance Change to Temperature (%) | Average Life (hr) |
|---|---|---|---|---|---|---|---|---|---|---|---|
| | m | x | R | a | b | M | c | d | e | | | |
| 24 | 1.007 | 0.00 | Lu | 1.5 | 0.7 | Mn/V(0.1/0.2) | 0.3 | 4.0 | 3.2 | 2100 | −14 | 160 |
| 25 | 1.007 | 0.00 | Y | 1.5 | 0.7 | Mn/V(0.1/0.2) | 0.3 | 1.4 | 0.5 | 2100 | −14 | 160 |
| 26 | 1.007 | 0.00 | Y/Er(1.0/0.5) | 1.5 | 0.7 | Mn/V(0.1/0.2) | 0.3 | 1.4 | 6.0 | 1900 | −13 | 180 |
| 27 | 1.007 | 0.00 | Sm/Dy(1.0/0.5) | 1.5 | 0.7 | Mn/V(0.1/0.2) | 0.3 | 1.4 | 6.0 | 1600 | −13 | 170 |

As is clear from Table 2, even when the dielectric ceramic layers were reduced in layer thickness to 0.8 μm and within the range that satisfies $0.960 \leq m \leq 1.030$; $0 \leq x \leq 0.20$; $0.2 \leq a \leq 5.0$; $0 \leq b \leq 2.0$; $0.2 \leq c \leq 1.0$; $0.5 \leq d \leq 4.0$; and $0.5 \leq e \leq 6.0$ in the general formula $\{100(Ba_{1-x}Ca_x)_m TiO_3 + aRO_{3/2} + bMgO + cMO_y + dSiO_2 + eLiO_{1/2}\}$, favorable results were obtained, such as the rate of capacitance change to temperature from −11% to −14%, which falls within ±15%, and the average life of 150 hours or more. More specifically, it has been confirmed that in the case of containing predetermined amounts of additives such as MgO, MO$_y$, SiO$_2$, and LiO$_{1/2}$, the balance between the temperature characteristics of capacitance and the high temperature load characteristics is not affected.

Laminated ceramic capacitor can be obtained which can achieve a balance between high temperature load characteristic and temperature characteristics of capacitance even when the dielectric ceramic is reduced in layer thickness to less than 1 μm.

What is claimed is:

1. A dielectric ceramic having main phase grains containing a barium titanate compound as their main constituent,
the dielectric ceramic comprising 12% to 84% of first crystal grains which are the main phase grains optionally including at least one rare earth element R selected from the group consisting of La, Ce, Pr, Nd, Gd, Tb, Dy, Ho, Er, Tm, Tb, Lu, and Y in a minute amount present as a solid solution therein, and 16% to 88% of second crystal grains having a core section comprising the main phase grains and a shell section around the core section and comprising main phase grains having therein at least one rare earth element R present as a solid solution,
wherein the first crystal grains have an amount of rare earth element R such that its solid solubility distance is 5 nm or less (including 0) in the main phase grain measured from the surface of the main phase grain toward the inside thereof and
wherein the shell section has a thickness of ⅛ or more and ⅜ or less the diameter of the main phase grain.

2. The dielectric ceramic according to claim 1, wherein the shell section has a thickness of ⅛ or more and ⅜ or less the diameter of the main phase grain.

3. The dielectric ceramic according to claim 2, wherein the composition formula is represented by $\{100(Ba_{1-x}Ca_x)_m TiO_3 + aRO_{3/2} + bMgO + cMO_y + dSiO_2 + eLiO_{1/2}\}$ in which formula, M represents at least one of Mn and V, and y represents a positive number determined by the valence of M, and
$0.960 \leq m \leq 1.030$;
$0 \leq x \leq 0.20$;
$0.2 \leq a \leq 5.0$;
$0 \leq b \leq 2.0$;
$0.2 \leq c \leq 1.0$;
$0.5 \leq d \leq 4.0$; and
$0.5 \leq e \leq 6.0$.

4. A laminated ceramic capacitor comprising: a ceramic sintered body having alternately stacked dielectric ceramic layers and internal electrodes; and external electrodes on the ceramic sintered body,
wherein the dielectric ceramic layers comprise the dielectric ceramic according to claim 3.

5. A laminated ceramic capacitor comprising: a ceramic sintered body having alternately stacked dielectric ceramic layers and internal electrodes; and external electrodes on the ceramic sintered body,
wherein the dielectric ceramic layers comprise the dielectric ceramic according to claim 2.

6. A laminated ceramic capacitor comprising: a ceramic sintered body having alternately stacked dielectric ceramic layers and internal electrodes; and external electrodes on the ceramic sintered body,
wherein the dielectric ceramic layers comprise the dielectric ceramic according to claim 1.

7. A dielectric ceramic having main phase grains containing a barium titanate compound as their main constituent,
the dielectric ceramic comprising 12% to 84% of first crystal grains which are the main phase grains optionally including at least one rare earth element R selected from the group consisting of La, Ce, Pr, Nd, Gd, Tb, Dy, Ho, Er, Tm, Tb, Lu, and Y in a minute amount present as a solid solution therein, and 16% to 88% of second crystal grains having a core section comprising the main phase grains and a shell section around the core section and comprising main phase grains having therein at least one rare earth element R present as a solid solution,
wherein the first crystal grains have an amount of rare earth element R such that its solid solubility distance is 5 nm or less (including 0) in the main phase grain measured from the surface of the main phase grain toward the inside thereof and
wherein the shell section has a thickness of ⅛ or more and ⅜ or less the diameter of the main phase grain, and
wherein the composition formula is represented by $\{100(Ba_{1-x}Ca_x)_m TiO_3 + aRO_{3/2} + bMgO + cMO_y + dSiO_2 + eLiO_{1/2}\}$ in which formula, M represents at least one of Mn and V, and y represents a positive number determined by the valence of M, and
$0.960 \leq m \leq 1.030$;
$0 \leq x \leq 0.20$;
$0.2 \leq a \leq 5.0$;
$0 \leq b \leq 2.0$;
$0.2 \leq c \leq 1.0$;
$0.5 \leq d \leq 4.0$; and
$0.5 \leq e \leq 6.0$.

8. A laminated ceramic capacitor comprising: a ceramic sintered body having alternately stacked dielectric ceramic layers and internal electrodes; and external electrodes on the ceramic sintered body, wherein the dielectric ceramic layers comprise the dielectric ceramic according to claim 4.

9. A dielectric ceramic having main phase grains containing a barium titanate compound as their main constituent, the dielectric ceramic comprising 12% to 84% of first crystal grains which are the main phase grains optionally including at least one rare earth element R selected from the group consisting of La, Ce, Pr, Nd, Gd, Tb, Dy, Ho, Er, Tm, Tb, Lu, and Y in a minute amount present as a solid solution therein, and 16% to 88% of second crystal grains having a core section comprising the main phase grains and a shell section around the core section and comprising main phase grains having therein at least one rare earth element R present as a solid solution, and wherein the composition formula is represented by $\{100(Ba_{1-x}Ca_x)_m TiO_3 + aRO_{3/2} + bMgO + cMO_y + dSiO_2 + eLi_{1/2}\}$ in which formula, M represents at least one of Mn and V, and y represents a positive number determined by the valence of M, and $0.960 \leq m \leq 1.030$;
$0 \leq x \leq 0.20$;
$0.2 \leq a \leq 5.0$;
$0 \leq b \leq 2.0$;
$0.2 \leq c \leq 1.0$;
$0.5 \leq d \leq 4.0$; and
$0.5 \leq e \leq 6.0$.

10. A laminated ceramic capacitor comprising: a ceramic sintered body having alternately stacked dielectric ceramic layers and internal electrodes; and
external electrodes on the ceramic sintered body, wherein the dielectric ceramic layers comprise the dielectric ceramic according to claim 9.

* * * * *